United States Patent Office 3,505,391
Patented Apr. 7, 1970

3,505,391
UNSATURATED SULFONIC ACID BETAINES
Heinrich Rinkler and Günther Nischk, Dormagen, Germany, assignors to Farbenfabriken Bayer Aktiengesellschaft, Leverkusen, Germany, a corporation of Germany
No Drawing. Filed Dec. 6, 1966, Ser. No. 599,380
Claims priority, application Germany, Dec. 16, 1965, F 47,937
Int. Cl. C07c 93/18, 93/20, 69/54
U.S. Cl. 260—477  1 Claim

ABSTRACT OF THE DISCLOSURE

Unsaturated sulfonic acid betaines are prepared by reacting N,N-disubstituted acid hydrazides with aliphatic sultones to produce the subject betaines useful as antistatic agents for synthetic polymeric materials.

---

This invention relates to unsaturated sulfonic acid betaines and to a process for their preparation by reacting unsaturated N,N-disubstituted acid hydrazides with sultones.

It is known to react aliphatic sultones with compounds which have a mobile hydrogen atom. In this process, the corresponding ω-sulphonic acids are obtained; thus for example in the reactions of sultones with carbonamide groups there are obtained, depending on the reaction conditions, the corresponding imino esters or N-substitution products with terminal sulphonic acid groups. In addition, it is known that tertiary amines can be alkylated on the nitrogen atom with sultones.

A process has now been found for the preparation of new unsaturated sulphonic acid betaines, in which unsaturated N,N-disubstituted acid hydrazides of the general formula (I)
$$R_1-\overset{O}{\overset{\|}{C}}-O-Y-\overset{X}{\underset{|}{N}}-CO-CO-NH-N\overset{R_2}{\underset{R_3}{\diagdown}}$$

wherein $R_1$ denotes an alkenyl or aralkenyl radical, $R_2$ and $R_3$ the same or different alkyl radicals, X hydrogen or lower alkyl radicals and Y aliphatic or aromatic radicals, are reacted with aliphatic sultones of the formula $$\begin{array}{c} R' \quad \left(R''\right) \quad R''' \\ \overset{|}{C}H-\left(\overset{|}{C}H\right)_m-\overset{|}{C}H \\ \overset{|}{O}\text{———}\overset{|}{C}O_2 \end{array}$$

wherein R', R'' and R''' denote hydrogen or lower alkyl radicals and m denotes the integers 1, 2, at temperatures of 0–150° C., if desired in an organic solvent and with the addition of polymerisation inhibitors.

As unsaturated N,N-disubstituted acid hydrazides there may be used, for example, the following compounds:

methacrylic acid-(oxamido-N,N-dimethylhydrazide)-ethyl ester,
methacrylic acid-(oxamido-N,N-diethylhydrazide)-ethyl ester,
crotonic acid-(oxamido-N,N-dimethylhydrazide)-ethyl ester,
cinnamic acid-(oxamido-N,N-dimethylhydrazide)-ethyl ester,
methacrylic acid-N-(methyl-oxamido-N,N-dimethylhydrazide)-ethyl ester,
crotonic acid-(N-methyl-oxamido-N,N-diethylhydrazide)-ethyl ester,
methacrylic acid-(3-oxamido-N,N-dimethylhydrazide)-phenyl ester,
methacrylic acid-(3-oxamido-N,N-diethylhydrazide)-phenyl ester,
methacrylic acid-(4-oxamido-N,N-diethylhydrazide)-phenyl ester,
crotonic acid-(3-oxamido-N,N-diethylhydrazide)-phenyl ester,
crotonic acid-(4-oxamido-N,N-diethylhydrazide)-phenyl ester,
cinnamic acid-(3-oxamido-N,N-dimethylhydrazide)-phenyl ester and
methacrylic acid-(5-oxamido-N,N-dimethylhydrazide)-naphthyl ester.

The unsaturated sulphonic acid betaines obtained correspond to the formula $$R_1-\overset{O}{\overset{\|}{C}}-O-Y-\overset{X}{\underset{|}{N}}-CO-CO-NH-\overset{R_2}{\underset{R_3}{N^{\oplus}}}-\overset{R'}{\underset{|}{C}}H-(\overset{R''}{\underset{|}{C}}H)_m-\overset{R'''}{\underset{|}{C}}H-SO_3^{\ominus}$$

wherein $R_1$ denotes an alkenyl radical or aralkenyl radical, $R_2$ and $R_3$ the same or different alkyl radicals, R', R'' and R''' hydrogen or lower alkyl radicals, X hydrogen or lower alkyl radicals, Y aliphatic or aromatic radicals and m an integer of 1 to 2. The alkyl radicals are preferably those having 1 to 4 C-atoms.

Unsaturated N,N-disubstituted acid hydrazides may, for example, be prepared by the following method: Aliphatic amino alcohols are reacted with unsaturated acid chlorides to form the corresponding unsaturated amino esters and converted into unsaturated acid-alkyl-oxamido-N,N-dialkylhydrazide esters with ethyl oxalate N,N-dialkyl hydrazides. Aminophenols, aminonaphthols are converted by means of oxalic acid diethyl ester into the corresponding phenol-, naphtholoxamido-ethyl esters and these are reacted on the hydroxyl group by means of unsaturated acid chlorides. The action of N,N-dialkyl hydrazides leads to unsaturated acid-aryl-oxamido-N,N-dialkylhydrazide esters.

The unsaturated N,N-disubstituted oxalic acid hydrazides obtained in this way are then reacted preferably in organic solvents with aliphatic sultones such as propanesultone-1,3 and butanesultone-1,4, advantageously at elevated temperature. In this operation, the alkylation products are obtained in a crystalline form and can be isolated by simple suction filtration. Preferably, an organic solvent is used in which the starting products are soluble. Such solvents include in particular the polar organic solvents such as aliphatic nitriles, for example aceto- or propionitrile, or N,N-disubstituted formamides, for example dimethylformamide. The process according to the invention is carried out at room temperature or elevated temperature up to 150° C., preferably between 40 and 100° C. The following compounds, for example, may be used as polymerisation inhibitors: Tertiary butyl pyrocatechol or phenothiazine.

It is surprising that the products according to the invention can be prepared as uniform compounds since the starting materials contain three nitrogen atoms which could react with sultones. It was therefore to be expected that all these nitrogen atoms would react with sultones, producing completely undefined products. However, in practice, only the N,N-disubstituted nitrogen atom of the hydrazide group is quaternated so that a uniform compound is obtained in yields of up to 90%.

The new compounds are suitable for use as antistatics. Using these compounds the antistatic properties of high molecular weight polymers such as polyvinyl chloride, polyethylene, polypropylene and polyamide can be substantially improved by incorporating the said compounds (on rollers) in quantities of 0.1 to 5% by weight based on the high molecular weight polymers.

For example there were mixed 10 parts by weight of (a) an unsaturated sulfonic acid betaine of the formula

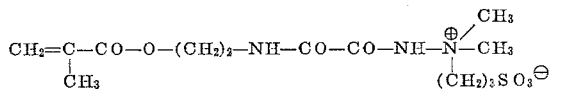

resp. (b) a polyglycol (trade name: Advastat 51) with 120 parts by weight of polyvinylchloride and 70 parts by weight of dioctylphthalate. The mixing was carried out for 30 minutes at temperatures of between 160 to about 170° C. on a rollmill and the obtained homogeneous mixture was rolled to a film having a thickness of 500μ.

After a storage of 4 days at 20° C. and 65% of relative atmospheric moisture, the surface resistivity has been measured. Then the films were treated with water at room temperature for four days and dried. After a storage of four days at 20° C. and 65% relative atmospheric moisture. The measuring of the surface resistivity has been repeated. The results are given in the following table:

| Antistatika | Surface resistivity in ohm-cm. | |
|---|---|---|
| | Before treatment with water | After treatment with water |
| (a) | $1.5 \times 10^8$ | $7.1 \times 10^8$ |
| (b) | $7.9 \times 10^9$ | $8.7 \times 10^{10}$ |

The following example illustrates more specifically the invention.

EXAMPLE 1

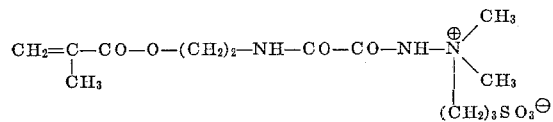

165 parts by weight of methacrylic acid-ω-aminoethyl ester and 160 parts of ethyl oxalate-N,N-dimethylhydrazide are dissolved in 1000 parts of methanol. 40 parts of sodium hydroxide dissolved in 200 parts of methanol are added through a dropping funnel at room temperature. The reaction mixture is then stirred for 6 to 8 hours at 30–50° C., the precipitated sodium chloride is filtered off and the filtrate is evaporated almost to dryness so that methacrylic acid (oxamido - N,N-dimethylhydrazide)-ethyl ester precipitates and can be filtered off. Yield, 220 parts; M.P., 90–92° C.

243 parts of methacrylic acid-(oxamido-N,N-dimethylhydrazide)-ethyl ester are dissolved in 1500 parts of acetonitrile and 1 part of phenothiazine is added as stabiliser. 130 parts of propanesultone-1,3 dissolved in 100 parts of acetonitrile are then added dropwise at room temperature. The reaction mixture is stirred at room temperature for 12–16 hours and then at about 80° C. for 24 hours. The quaternated product precipitates in crystalline form and can be filtered off. Yield, 290 parts; decomposition point 155–158° C.

EXAMPLE 2

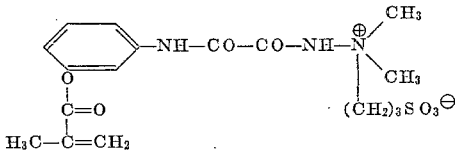

109 parts of 3-aminophenol are slowly heated to 150–60° C. with 300 parts of diethyl oxalate. About 40 to 45 parts of ethanol distil off in the process. The residue solidifies on cooling and is compacted off. Yield, 190 parts; M.P. 176° C.

209 parts of 3(oxamido-ethyl ester)phenol are dissolved in 800 parts of ethanol and treated with 70 parts of N,N-dimethylhydrazine. The reaction mixture is stirred for 3 hours at 60° C. After cooling, the precipitate is separated by suction filtration. Yield, 188 parts; M.P. 194–6° C.

223 parts of 3-oxamido-N,N-dimethylhydrazido-phenol are dissolved in 1000 parts of water. 138 parts of soda are then added and 135 parts of methacrylic chloride are added dropwise at 0° C. into the vigorously stirred solution. The reaction mixture is then stirred for several hours at 0° C., the precipitated product is removed by suction filtration and washed with cold water. Yield, 244 parts; M.P. 147–9° C.

291 parts of methacrylic acid (3-oxamido-N,N-dimethylhydrazide)-phenyl ester are dissolved in 1000 parts of acetonitrile, and 1 part of phenothiazine is added as stabiliser. 130 parts of propanesultone-1,3 dissolved in 100 parts of acetonitrile are then added dropwise. The reaction mixture is stirred at room temperature for 12 to 16 hours and then at 80° C. for 24 hours. The quaternated product precipitates in crystalline form and can be filtered off. Yield, 321 parts; decomposition point, 199–204° C.

EXAMPLE 3

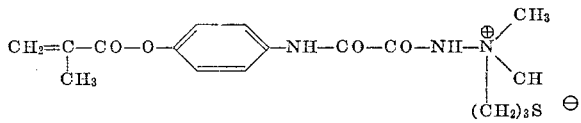

109 parts of 4-aminophenol are slowly heated to 150–60° C. with 300 parts of diethyl oxalate. About 40 to 45 parts of ethanol distil off in the process. The residue solidifies on cooling and is compacted. Yield, 188 parts; M.P. 181–2° C.

209 parts of 4-(oxamido-ethyl ester)-phenol are dissolved in 800 parts of ethanol, and 70 parts of N,N-dimethylhydrazine are added. The reaction mixture is stirred for 3 to 4 hours at 60° C. After cooling, the precipitate is filtered off with suction. Yield, 184 parts; M.P., 226–27° C.

223 parts of 4-oxamido-N,N-dimethylhydrazido-phenol are dissolved in 1000 parts of water. 138 parts of soda are then added and 135 parts of methacrylic chloride are then added dropwise at 0° C. into the vigorously stirred solution. The mixture is then stirred for several hours at 0° C. and the precipitated product is filtered off under suction and washed with cold water. Yield, 235 parts; M.P., 171–4° C.

291 parts of methacrylic-(4-oxamido-N,N-dimethylhydrazide)-phenyl ester are dissolved in 1000 parts of acetonitrile, and 1 part of phenothiazine is added as stabiliser. 130 parts of propylene sultone-1,3 dissolved in 100 parts of acetonitrile are then added dropwise. The reaction mixture is stirred for 12 to 16 hours at room temperature and then for 24 hours at 80° C. The quaternated product precipitates in crystalline form and can be filtered off. Yield 316 parts, decomposition point 209–11° C.

EXAMPLE 4

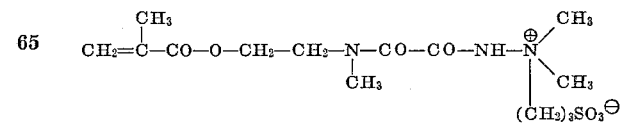

75 parts of N-methylethanolamine and 160 parts of ethyl oxalate-N,N-dimethylhydrazide are stirred for about 48 hours at 100° C. The ethanol formed is then distilled off and the crystalline paste which separates on cooling is recrystallised with acetonitrile. Yield, 149 parts, M.P., 174–76° C.

189 parts of ω-hydroxyethyl-N-methyl-oxamido-N,N-dimethylhydrazide are dissolved in 750 parts of methylene chloride, and 110 parts of triethylamine are added. After the addition of 1 part of phenothiazine, 110 parts of methacrylic chloride are added dropwise at 0° C. The reaction mixture is stirred for another few hours at room temperature. Triethylamine hydrochloride is removed by suction filtration, the mother liquor is concentrated by evaporation and the residue is recrystallised from acetonitrile. Yield, 192 parts; M.P., 52–53° C.

117 parts of

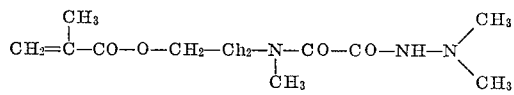

are dissolved in 700 parts of acetonitrile, and 1 part of phenothiazine is added as stabiliser. 65 parts of propanesultone-1,3-dissolved in 100 parts of acetonitrile are added dropwise at room temperature. The reaction mixture is stirred for 12 to 16 hours at room temperature and then for 24 hours at 75–80° C. The quaternated product precipitates in crystalline form and can be filtered off. Yield, 144 parts; M.P., 152–54° C.

What we claim is:
1. Unsaturated sulfonic acid betaine of the formula:

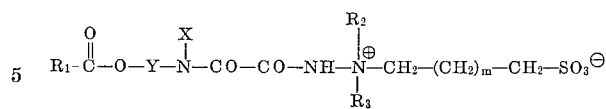

wherein $R_1$ is selected from the group consisting of lower alkenyl and phenyl lower alkenyl, $R_2$ and $R_3$ denote the same or different alkyl radicals having 1–4 carbon atoms, X is selected from the group consisting of hydrogen and lower alkyl radical, Y is selected from the group consisting of phenyl, naphthyl, and lower alkyl, and $m$ is an integer of from 1 to 2.

References Cited

FOREIGN PATENTS 6,502,121  8/1965  Netherlands.

OTHER REFERENCES

Chem. Abstracts, vol. 64 March (1966), col. 9637a.

LORRAINE A. WEINBERGER, Primary Examiner

E. J. GLEIMAN, Assistant Examiner

U.S. Cl. X.R

260—479, 486, 45.85

UNITED STATES PATENT OFFICE
CERTIFICATE OF CORRECTION

Patent No. 3,505,391      Dated April 7, 1970

Inventor(s) Heinrich Rinkler et al.

It is certified that error appears in the above-identified patent and that said Letters Patent are hereby corrected as shown below:

| COLUMN | LINE | ERROR |
|---|---|---|
| 1 | 45-50 formula | "$\begin{array}{c} R''' \\ \mid \\ -CH \\ \mid \\ CO_2 \end{array}$" should read --- $\begin{array}{c} R''' \\ \mid \\ -CH \\ \mid \\ SO_2 \end{array}$ --- |
| 4 | Example 3 formula | "$-\overset{\oplus}{N}\begin{array}{c} CH_3 \\ \diagdown \\ \diagup \\ CH \end{array}$ $(CH_2)_3 S$" should read --- $\overset{\oplus}{N}\begin{array}{c} CH_3 \\ \diagdown \\ \diagup \\ CH_3 \end{array}$ $(CH_2)_3 SO^{\ominus}$ --- |

SIGNED AND SEALED
SEP 22 1970

(SEAL)
Attest:

Edward M. Fletcher, Jr.
Attesting Officer

WILLIAM E. SCHUYLER, JR.
Commissioner of Patents